United States Patent
Berstis

(10) Patent No.: US 6,799,462 B1
(45) Date of Patent: *Oct. 5, 2004

(54) GRAVIMETRIC MEASUREMENT METHOD AND SYSTEM

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/455,158

(22) Filed: Jun. 5, 2003

(51) Int. Cl.$^7$ .......................... G01P 15/13; G01P 15/105
(52) U.S. Cl. .............................. 73/514.31; 73/514.16; 73/514.17; 33/345; 367/185
(58) Field of Search .............. 73/570.5, 514.16–514.17, 73/514.31, 432.1, 382; 310/90.5; 33/344–345; 367/185–186

(56) References Cited

U.S. PATENT DOCUMENTS

| | | | |
|---|---|---|---|
| 3,492,738 A | * 2/1970 | Simon .......................... | 33/344 |
| 3,626,364 A | * 12/1971 | Simon et al. ................ | 367/185 |
| 3,664,196 A | * 5/1972 | Codina .................... | 73/514.19 |
| 3,815,963 A | * 6/1974 | Wilk ......................... | 310/90.5 |
| 3,831,287 A | * 8/1974 | Sawdo et al. ................. | 33/344 |
| 4,573,356 A | 3/1986 | Barmatz et al. ........... | 73/570.5 |
| 5,203,209 A | 4/1993 | Watkins et al. ............ | 73/570.5 |
| 5,883,454 A | * 3/1999 | Hones et al. ............... | 310/90.5 |
| 5,955,800 A | * 9/1999 | Shearwood et al. .. | 310/40 MM |
| 6,079,267 A | * 6/2000 | Hull .......................... | 73/382 R |
| 6,361,268 B1 | * 3/2002 | Pelrine et al. ........... | 414/749.2 |
| 6,465,739 B1 | 10/2002 | Shepherd et al. ........ | 174/125.1 |

FOREIGN PATENT DOCUMENTS

| | | | |
|---|---|---|---|
| GB | 2211497 | 7/1989 | ........... C04B/35/00 |

OTHER PUBLICATIONS

"Diamagnetic Levitation" by Martin Simon, downloaded on May 28, 2003 from http://www.physics.ucla.edu/marty/diamag/index.html, 3 pages.

* cited by examiner

Primary Examiner—Hezron Williams
Assistant Examiner—Rose M. Miller
(74) Attorney, Agent, or Firm—Robert H. Frantz; David A. Mims, Jr.

(57) ABSTRACT

A mass is levitated with respect to a base at least one of which is comprised of a diamagnetic material, and the levitation mass also having a permanent magnetic property. A second permanent magnet is configured such that it attracts the levitation mass away from said base surface with sufficient magnetic force to overcome gravitational force on the mass, thereby suspending the mass over the surface of the base. The mass is levitated at room temperature, eliminating need for cryogenic mechanisms and materials, and is contained in a nonmagnetic, non-shielding optically-transparent housing so as to limit its excursion within a range of levitation positions. A non-intrusive position or distance measurement means may be optionally configured with the system, such as a laser interferometer, thereby allowing the levitated mass to act as a gravimetric device.

20 Claims, 6 Drawing Sheets

Fig. 1 *Prior Art*

GRAVIMETRIC MEASUREMENT METHOD AND SYSTEM

BACKGROUND OF THE INVENTION

1. Field of the Invention

This invention relates to methods for measuring the strength and variation of gravitational fields.

2. Background of the Invention

Gravimetric measuring devices are well know in the art, although they are highly specialized and expensive systems. To make a measurement of a gravitational field, a small, well-known mass is typically employed. Because any mechanical support of the mass will also drastically effect or even obscure the relatively week effects of a gravitational field, typical means of mechanical support of a mass are not useful for gravimetrics.

For example, a typical scale to measure the weight of an item employs a spring to support the item. The mass of the item is estimated by measuring the compression of the spring when the item is suspended or supported by the spring. Variations in gravitational fields from one place to another, however, are so minute that they are immeasurable with even the most sensitive springs as the variations of the spring's force due to temperature, mechanical vibration, etc., are many times larger than the force variations in gravitational fields.

To this end, magnetism, and more specifically repelling magnetic forces, have been employed to suspend small masses for gravimetric measurements. Magnetism can be divided into three types of magnetic behavior: diamagnetism, paramagnetism, and ferromagnetism.

Ferromagnetism is the type of magnetism most commonly employed in modern, daily life. It is the result of naturally aligned intrinsic spin axes of individual electrons of the atoms of the material. Lodestone, iron and magnetite are some of the common materials used to create "permanent magnets", as they exhibit their strong, dipolar magnetic properties under all conditions and temperatures, with or without the presence of other types of fields.

Initially, one who is unacquainted with magnetic theories may suspect that suspension or levitation of a small mass could be achieved using an arrangement of "permanent magnets", or ferromagnets. In 1842, however, Samuel Earnshaw proved his theorem that there is no stable configuration to levitate permanent magnets using static magnetic fields.

Some quasi-stable levitation arrangements have been achieved by spinning the levitated mass, in which gyroscopic moments offset the inherent instability of the forces otherwise exerted on the suspended mass. Unfortunately, the gyroscopic forces are also large enough to offset or obscure the effects of small forces, such as variations in gravitational field, on the suspended mass. Additionally, energy must be induced into the spinning mass to keep it spinning over time, which may also obscure gravimetric measurements.

Diamagnetism may be viewed as an atomic version of Lenz's Law which provides that an electric current resulting from an applied magnetic field will be in a direction which sets up an opposing magnetic field. For example, if a dipole rod magnet (31) is passed or moved v(t) through an electrically conductive ring (30), a current i(t) will be induced in the ring in a direction which sets up a magnetic field (32, 32') which opposes the movement v(t) of the rod magnet, as shown in FIG. 1. This reactive current and opposing magnetic field is created regardless of the polarity of the inducing magnet.

All known elements are believed to exhibit some degree of diamagnetism. Most elements, however, do not exhibit noticeable or measurable diamagnetic properties. Under cryogenic conditions, such as 77 K, superconductive properties of many elements allow for substantial diamagnetic properties.

Under such cryogenic conditions, Lenz's law can be applied to statically levitate a small magnetic mass above a strong diamagnetic material, taking advantage of the Meisner Effect in which movements of the levitated mass result in a reactive and opposing field to correct for the movements, thereby leaving it in a stable position suspended above the diamagnetic material without any means of mechanical support. For example, as shown in FIG. 2, a small magnetic mass (41), such as a Samarium Cobalt magnet, can be levitated a distance d above a superconductive diamagnetic material (42) such as a ceramic Yttrium compound, which is superconductive at temperatures such as 77 K.

Such a cryogenic, diamagnetic arrangement has been employed by some gravimetric measurement systems, as the force between the levitated mass and the diamagnetic base is highly stable and constant, thereby allowing any differences in displacement between the base and the levitated mass to be attributed to the tiny variations in gravitational field. A laser interferometer may be employed to accurately measure the position of the levitated mass.

This type of gravimetric arrangement, however, is highly dependent on maintaining cryogenic conditions, which implies a need for a considerable supply of coolant such as liquid Nitrogen. Additionally, this type of system is difficult and expensive to operate due to the cryogenesis. Therefore, there is a need in the art for a system and method for gravimetric measurement which avoids the need for superconductive conditions, materials, and supplies.

BRIEF DESCRIPTION OF THE DRAWINGS

The following detailed description when taken in conjunction with the figures presented herein provide a complete disclosure of the invention.

SUMMARY OF THE INVENTION

In a first aspect of the present invention, an arrangement is provided which allows for stable or static levitation or suspension in free space of a permanent magnet at room temperature. The arrangement provides limited excursion of the levitated mass in an optically transparent housing so as to prevent the mass from being drawn into contact an upper magnet, to prevent the mass from sliding out of a stable position with respect to the upper magnet and the diamagnetic material, and to allow for optical or capacitive position and deflection measurement of the mass.

A permanent magnet, such as a Neodymium-Boron-Iron magnet, is statically levitated over a block of diamagnetic material, such as pyrolytic graphite, using a second permanent magnet, such as a second Neodymium-Boron-Iron magnet, to reduce or offset the weight of the first magnet. Levitation of the first magnet is accomplished without any application of energy, and operates at room temperature without need for cryogenic conditions.

To achieve gravimetric measurements, offsets and changes in the distance between the levitated permanent magnet are measured using non-intrusive mechanisms such as a laser interferometer.

DESCRIPTION OF THE INVENTION

Figure 1:
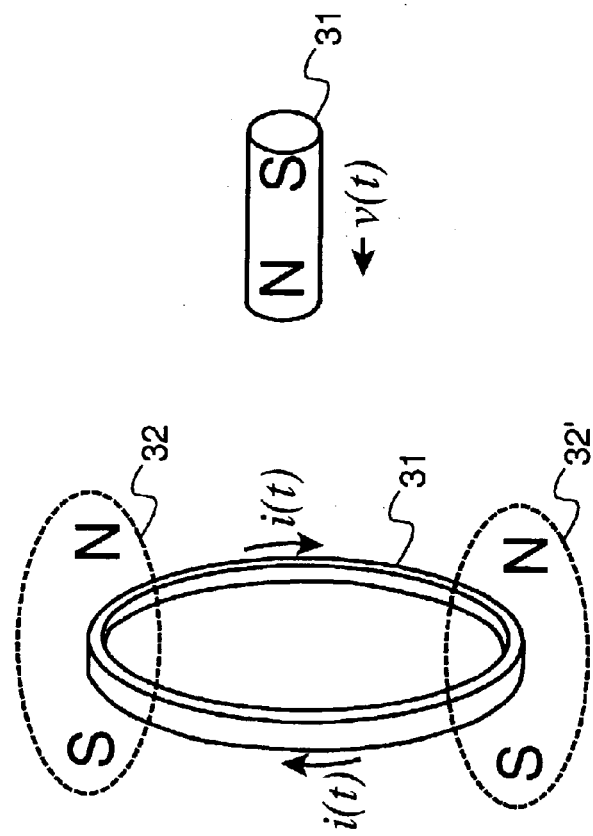
FIG. 1 shows an illustration for understanding of Lenz's law.
Figure 2:
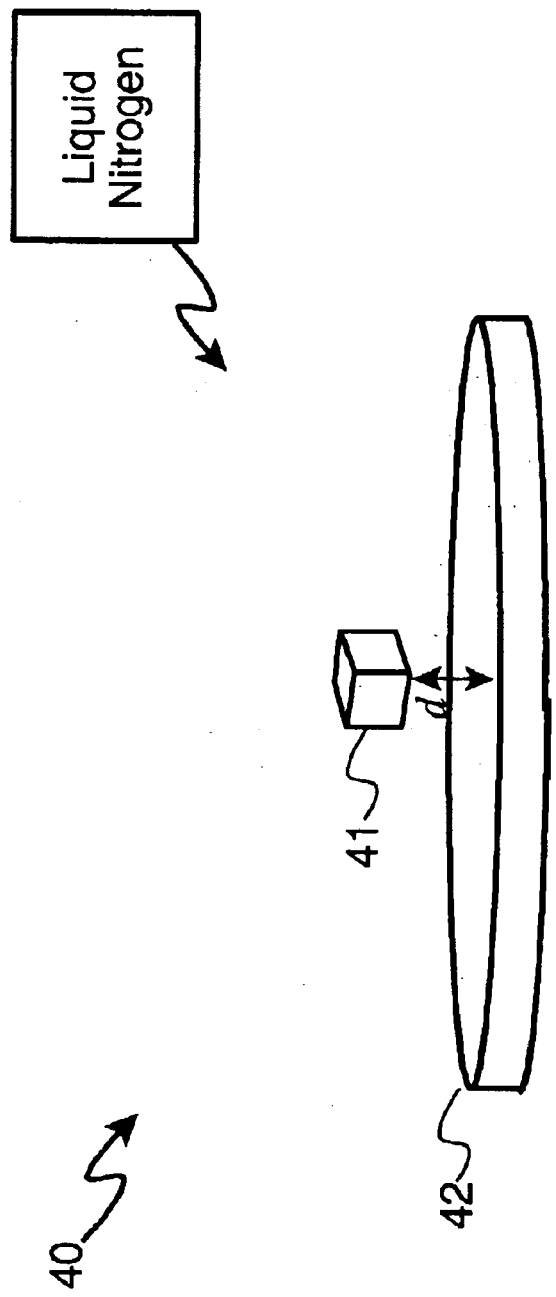
FIG. 2 depicts a levitated mass using diamagnetism at cryogenic temperatures.
Figure 3:
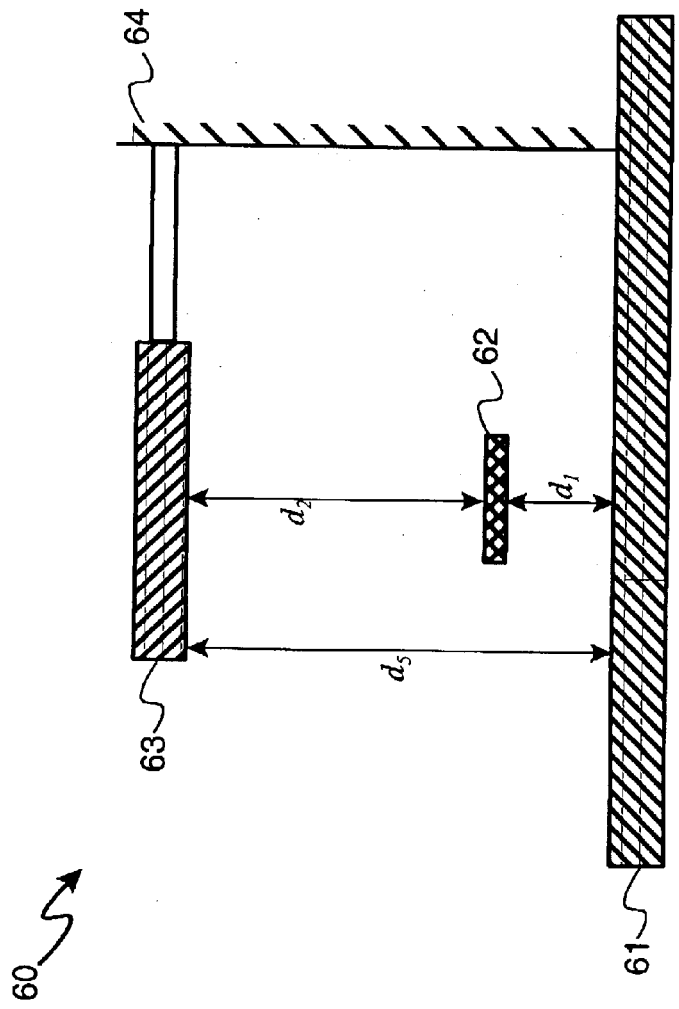
FIG. 3 depicts a known arrangement of permanent magnets and diamagnets which levitates a mass at room temperature.

Turning to FIG. 3, our arrangement and device first employs a known arrangement (60) comprising a block (61) or base constructed of any suitable form of carbon which exhibits diamagnetic properties, and particularly graphite and pyrolytic graphite. Bismuth is known to have similar diamagnetic properties. Positioned above the block (61) is a permanent magnet of any sort, but preferably of a Neodymium-Boron-Iron compound, because they make the most powerfully permanent magnets known to date.

According to an alternative embodiment, a small carbon sheet can be levitated above an arrangement of magnets, in which the diamagnetic mass is the one levitated and the base is comprised of one or more permanent magnets. In either arrangement, the diamagnetic repulsion forces are used to stabilize the configuration at non-cryogenic temperatures.

Further according to this arrangement, a second permanent magnet (63) such as a Neodymium-based magnet is statically (64) provided above the base (61) such that the levitation mass (62) is disposed between the top magnet (63) and the base magnet (61). This second permanent magnet (63) is rigidly affixed (64) at a distance $d_5$ from the base (61), and is used to attract the suspended mass (62) upwards and away from the base (61), thereby offsetting most of the actual weight of the suspended mass (62). In this arrangement, the diamagnetic forces are the stabilizing forces, and the attractive forces between the top permanent magnet (63) and the levitated mass provide the bulk of the lifting force.

Although this arrangement (60) is good for experiments and theorem demonstration, it is susceptible to the levitated mass (62) sliding out of a stable position from side-to-side, or being drawn into contact with the top magnet (63) as the result of mechanical vibration or jolting of the configuration.

Figure 4:
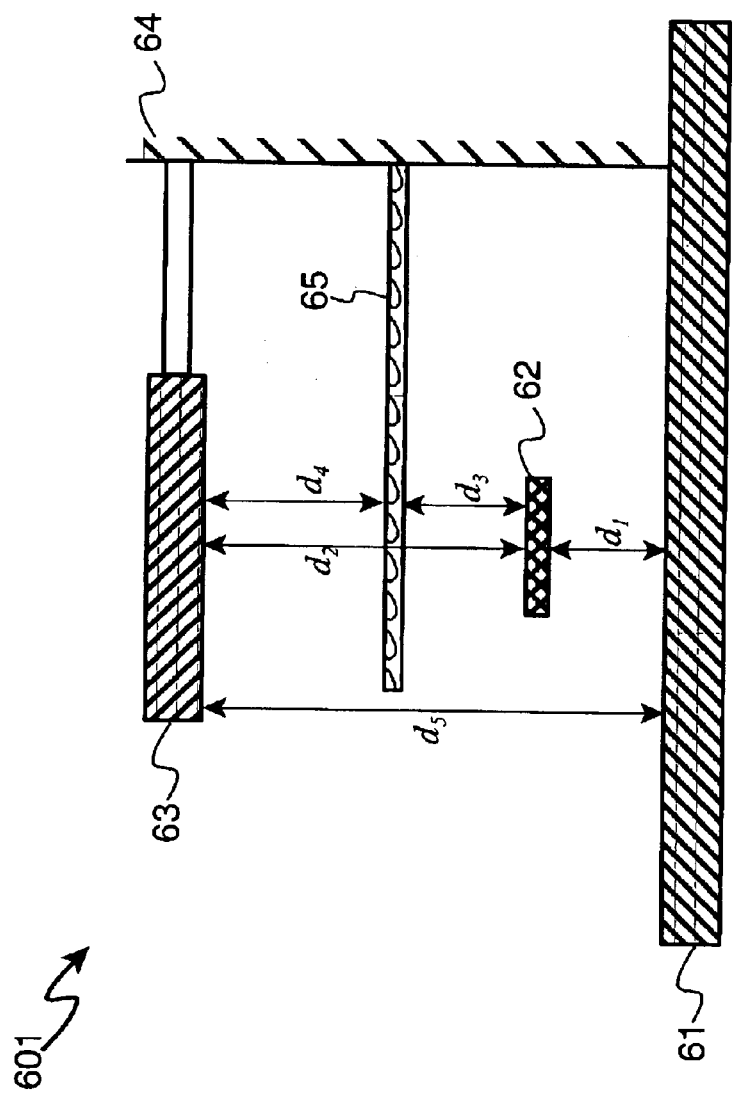
FIG. 4 illustrates a structural configuration according to the present invention in which an upward-travel screen is employed to prevent the levitated mass from being attracted to and contacting with the top magnet.

Turning to FIG. 4, one aspect of the present invention is illustrated, in which a upper limit screen (65) is placed between the top magnet (63) and the levitated mass (62). As shown in this configuration (601), the top magnet (63) attracts the levitated mass (62) to reduce its weight so that the diamagnetism of the carbon is sufficient to stabilize the levitation. It is desirable to have the top magnet (63) as powerful as possible so that its field lines are as close to parallel as possible in the vicinity of the levitating mass, thereby allowing the size of the region of stable levitation to be maximized. However, if the levitated mass (62) is raised to an increased distance $d_1$ above the base (61), the top magnet (63) will overpower the gravitational force on the mass (62), and will attract the levitated mass to it due to the decreased distance $d_2$, immobilizing the levitated mass.

As such, we have placed a screen (65) comprised of a nonmagnetic, non-shielding and preferrably optically transparent material above the levitated mass (62) and below the top magnet (63) to limit the maximum excursion distance $d_1+d_2$ of the mass (62) from the base (61) (e.g. to set a minimum distance $d_2$ between the mass and the top magnet). This keeps the mass from "flying" to the top magnet when disturbed by vibration or movement. The distances $d_1$, $d_2$, $d_3$, $d_4$, and $d_5$ may be determined empirically or by experiment based upon the mass and strength of the mass to be levitated (62), the strength of the top magnet (63), and the strength of the base material (61).

Figure 5:
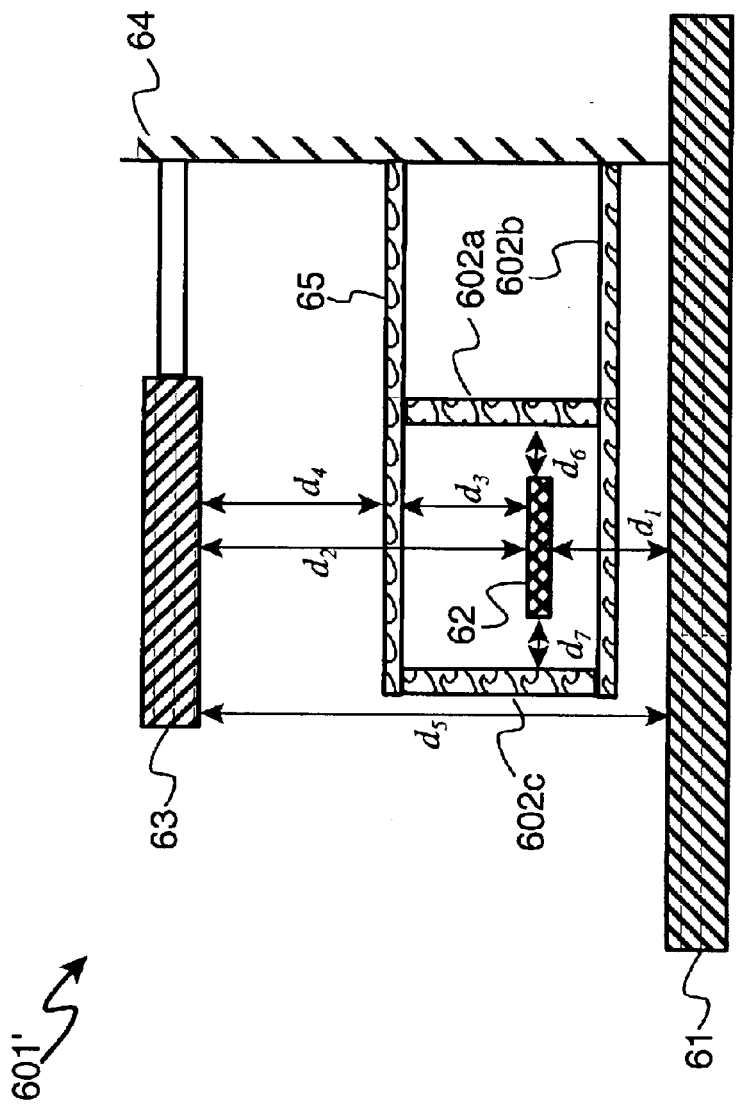
FIG. 5 shows a structural arrangement of the present invention in which the levitated mass is encapsulated in a housing for further excursion limitation, and providing the ability to place the mass in a near or complete vacuum.

Further, according to another aspect of our invention and as shown in FIG. 5, the levitated mass (62) is encased by a bottom (602b) and two sides (602a, 602c). The sides provide a means to prevent the mass from traveling too far in a side-to-side motion ($d_6$, $d_7$) such that it is maintained in a stable position relative to the base and the top magnet. The bottom (602b) forms an enclosure which around the mass (62) such that a full or partial vacuum may be created within the enclosure, thereby reducing resistance to movement (e.g. increasing sensitivity) of the mass due to gas surrounding the mass, and reducing noise and vibration imparted to the mass by the surrounding gas.

The sides (602a, 602c) and bottom (602b) may optionally be constructed of optically transparent material, and preferrably are nonmagnetic, non-shielding, as well.

The structure and device of FIG. 5 is useful to realize a gravimetric device which operates at temperatures including and beyond cryogenic or superconductive conditions. While there is no reason the device will not work well at cryogenic temperatures, it has also been demonstrated to work well at room temperature.

Figure 6:
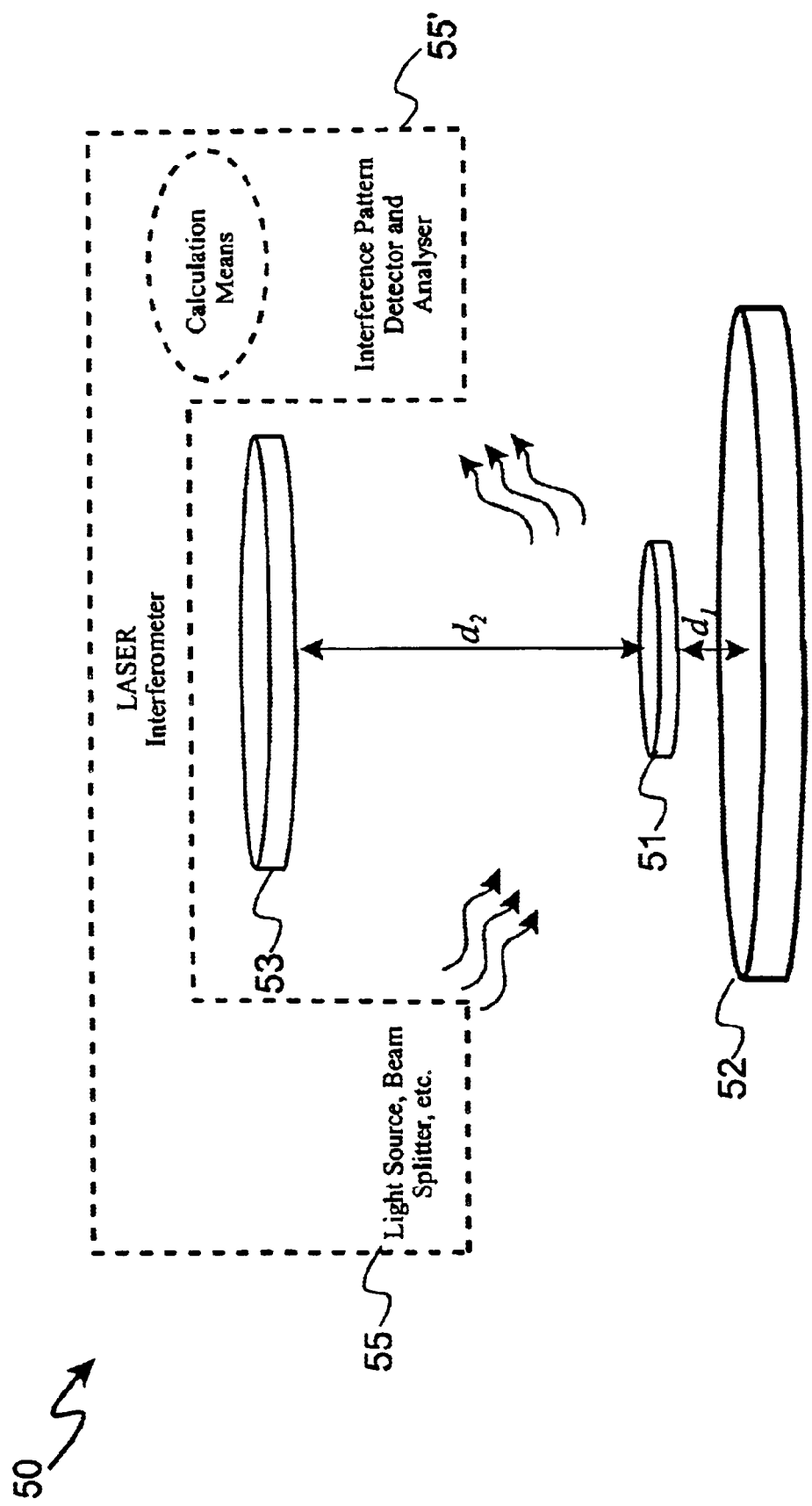
FIG. 6 illustrates a measurement device embodiment of the present invention.

As shown in FIG. 6, the distance $d_1$ between the base (52) and the levitated mass (51) can be measured using a non-intrusive means such as a laser interferometer (55, 55') or capacitance bridge, with the mass (51) suspended between a top magnet (53) which is rigidly affixed with respect to the base (52). A screen and enclosure, previously described but not shown in this figure, are also employed to set a minimum distance $d_2$ achievable between the mass (51) and the top magnet (53) to prevent "fly up", and to prevent sideways excursions of the levitated mass. If a laser interferometer is used for position and deviation measurements, the screen, sides, and bottom of the enclosure should be constructed appropriately of transparent material at the wavelength of the laser.

As gravitational forces placed on the levitated mass (51) will slightly increase or decrease the distance, the displacement $\Delta d_1$ can be measured by a component such as a laser interferometer. Using the known mass of the levitated magnet (51), the actual strength or change in strength of the gravitational force can be easily determined.

Conclusion

The present invention provides a dramatic and significant simplification for devices such as gravimetric equipment not to have to use cryogenic fluids to cool the superconductors used in them for purpose of levitating a magnet. Furthermore, there is no need for extra equipment to induce the initial currents in any superconductors that needed to be used as the magnets. The ability of our new device to operate with diamagnetic advantages at room temperature is unique and useful.

It will be recognized by those skilled in the art that the method and structures disclosed here are representative of the invention, and that many variations, alternate embodiments and substitutions for the disclosed elements, structures and materials may be made without departing from the spirit and scope of the present invention. Therefore, the scope of the present invention should be determined by the following claims.

What is claimed is:

1. A method for levitating a mass with respect to a base, the method comprising the steps of:
providing a mass to be levitated and a base, at least one of which is comprised of a material having a diamagnetic property, said base having at least one surface, and said levitation mass having a permanent magnetic property;
placing said levitation mass on or near said surface of said base such that an ambient gravitational force incident on said levitation mass draws the mass towards said base surface;
arranging a second permanent magnet such that it attracts said levitation mass away from said base surface with sufficient magnetic force to overcome said gravitational force such that the levitation mass is suspended away from said base surface; and
disposing an upward excursion limitation screen between said second permanent magnet and said levitation mass in a configuration so as to prevent the levitation mass from contacting said second permanent magnet.

2. The method as set forth in claim 1 further comprising configuring an enclosure around the sides and beneath said levitation mass in order to limit side-to-side excursions of said levitation mass, and to provide a sealable environment within which the levitation mass is contained.

3. The method as set forth in claim 1 wherein said levitation mass is constructed of a material comprising a diamagnetic element selected from the group of diamagnetic carbon, graphic, pyrolytic graphite, and Bismuth.

4. The method as set forth in claim 1 wherein said levitation mass is constructed of a material comprising a ferromagnetic element selected from the group of Lodestone, iron, magnetite, Neodymium-Boron-Iron, Samarium Cobalt.

5. The method as set forth in claim 1 wherein said base is constructed of a material comprising a diamagnetic element selected from the group of diamagnetic carbon, graphic, pyrolytic graphite, and Bismuth.

6. The method as set forth in claim 1 wherein said base is constructed of a material comprising a ferromagnetic element selected from the group of Lodestone, iron, magnetite, Neodymium-Boron-Iron, Samarium Cobalt.

7. The method as set forth in claim 1 wherein said second permanent magnet is constructed of a material comprising a ferromagnetic element selected from the group of Lodestone, iron, magnetite, Neodymium-Boron-Iron, Samarium Cobalt.

8. The method as set forth in claim 1 further comprising providing a means for measuring a distance value between said base and said levitation mass.

9. The method as set forth in claim 8 wherein said means for measurement comprises a laser interferometer.

10. The method as set forth in claim 8 further comprising a calculation means configured to determine a value of gravitational force incident on said levitation mass.

11. A system for levitating a mass with respect to a base, the system comprising:
a mass to be levitated and a base, at least one of which is comprised of a material having a diamagnetic property, said base having at least one surface, said levitation mass having a permanent magnetic property, said levitation mass being configured on or near said base surface such that an ambient gravitational force incident on said levitation mass draws the mass towards said base surface;
a second permanent magnet configured juxtapositioned to said base surface such that it attracts said levitation mass away from said base surface with sufficient magnetic force to overcome said gravitational force such that the levitation mass is suspended away from said base surface; and
an upward excursion limitation screen disposed between said second permanent magnet and said levitation mass in a configuration so as to prevent the levitation mass from contacting said second permanent magnet.

12. The system as set forth in claim 11 further comprising an enclosure configured around the sides and beneath said levitation mass in order to limit side-to-side excursions of said levitation mass, and to provide a sealable environment within which the levitation mass is contained.

13. The system as set forth in claim 11 wherein said levitation mass is constructed of a material comprising a diamagnetic element selected from the group of diamagnetic carbon, graphic, pyrolytic graphite, and Bismuth.

14. The system as set forth in claim 11 wherein said levitation mass is constructed of a material comprising a ferromagnetic element selected from the group of Lodestone, iron, magnetite, Neodymium-Boron-Iron, Samarium Cobalt.

15. The system as set forth in claim 11 wherein said base is constructed of a material comprising a diamagnetic element selected from the group of diamagnetic carbon, graphic, pyrolytic graphite, and Bismuth.

16. The system as set forth in claim 11 wherein said base is constructed of a material comprising a ferromagnetic element selected from the group of Lodestone, iron, magnetite, Neodymium-Boron-Iron, Samarium Cobalt.

17. The system as set forth in claim 11 wherein said second permanent magnet is constructed of a material comprising a ferromagnetic element selected from the group of Lodestone, iron, magnetite, Neodymium-Boron-Iron, Samarium Cobalt.

18. The system as set forth in claim 11 further comprising a means for measuring a distance value between said base and said levitation mass.

19. The system as set forth in claim 18 wherein said means for measurement comprises a laser interferometer.

20. The system as set forth in claim 18 further comprising a calculation means configured to determine a value of gravitational force incident on said levitation mass.

* * * * *